United States Patent [19]

Mullen et al.

[11] Patent Number: 4,568,264

[45] Date of Patent: Feb. 4, 1986

[54] COMBUSTION CHAMBER CONSTRUCTION

[75] Inventors: James J. Mullen; Charles W. Adams; Floyd E. Cherington, all of Carrollton, Tex.

[73] Assignee: Lennox Industries, Inc., Carrollton, Tex.

[21] Appl. No.: 457,737

[22] Filed: Jan. 14, 1983

[51] Int. Cl.⁴ ............................................. F23C 11/04
[52] U.S. Cl. .................................... 431/1; 237/55; 126/110 R; 431/114
[58] Field of Search ............... 431/114, 157, 158, 258, 431/263, 265, 1; 126/99 E, 110 R, 110 B, 116 R; 237/55; 60/39.77

[56] References Cited

U.S. PATENT DOCUMENTS

| | | | |
|---|---|---|---|
| 1,379,180 | 5/1921 | Good | 431/157 |
| 1,702,731 | 2/1929 | Hymer | 431/1 |
| 1,990,695 | 2/1935 | Jerome | 431/265 |
| 2,379,017 | 6/1945 | McCollum | 431/114 |
| 2,440,491 | 4/1948 | Schwander | 431/263 |
| 2,577,918 | 12/1951 | Rowe | 431/114 |
| 2,607,167 | 8/1952 | Brenner | 431/158 |
| 2,634,804 | 4/1953 | Erickson | 431/1 |
| 2,638,895 | 5/1953 | Swindin | 431/158 |
| 2,643,708 | 6/1953 | Sherman | 431/263 |
| 2,807,931 | 10/1957 | Boding | 431/158 |
| 2,839,046 | 6/1958 | Kamm | 431/1 |
| 2,929,210 | 3/1960 | Howes | 431/1 |
| 2,950,592 | 8/1960 | Frank | 431/1 |
| 2,964,103 | 12/1960 | Ryder | 431/114 |
| 2,967,382 | 10/1959 | McIlvaine | 431/1 |
| 3,091,224 | 5/1963 | Rydberg | 431/1 |
| 3,151,454 | 10/1964 | Curtis | 431/1 |
| 3,169,570 | 2/1965 | Haag et al. | 431/1 |
| 3,171,465 | 3/1965 | Rydberg | 431/1 |
| 3,221,796 | 12/1965 | Nesbitt | 431/185 |
| 3,418,060 | 12/1968 | Spielman | 431/158 |
| 3,447,878 | 6/1969 | Haag et al. | 431/1 |
| 3,531,229 | 9/1970 | Berglund | 431/158 |
| 3,574,499 | 4/1971 | Turpin | 431/158 |
| 3,720,497 | 3/1973 | Arenson | 431/158 |
| 3,749,548 | 7/1973 | Zink | 431/158 |
| 3,810,732 | 5/1974 | Koch | 431/7 |
| 3,819,318 | 6/1974 | Pearson | 431/1 |
| 3,940,242 | 2/1976 | Matsumura | 431/158 |
| 3,963,018 | 6/1976 | Schultz | 431/158 |
| 4,054,097 | 10/1977 | Barkhuus | 431/1 |
| 4,153,201 | 5/1979 | Berger | 431/1 |
| 4,168,948 | 9/1979 | Okamoto | 431/114 |
| 4,257,760 | 3/1981 | Schuurman | 431/158 |
| 4,260,361 | 4/1981 | Huber | 431/1 |

Primary Examiner—Larry Jones
Assistant Examiner—Noah Kamen
Attorney, Agent, or Firm—Allegretti, Newitt, Witcoff & McAndrews, Ltd.

[57] ABSTRACT

An improved combustion chamber for a condensing furnace comprising an elongated cast body having a mixing chamber for receiving fuel and air and an expansion chamber communicating with said mixing chamber, a fuel inlet in said body communicating with said mixing chamber, an air inlet in said body communicating with said mixing chamber and means for igniting the air fuel mixture in said mixing chamber, the fuel inlet and the igniting means being opposed to one another to enhance the ignition of the fuel and air in the mixing chamber. An important feature of the invention is the critical ratio of the transverse cross sectional area of the expansion chamber to the transverse cross sectional area of the mixing chamber for maintaining continuity of operation. Such ratio should be about 2/1 to 2.4/1. In a preferred form of the invention, the igniting means is a spark plug and the spark plug opening into the mixing chamber is co-axial with the fuel inlet. In another aspect of the invention, the ratio of the maximum Btu input for the condensing furnace with respect to the volume (cubic inches) of the mixing chamber of the combustion chamber is in the range of 4,500/1 to 4,800/1.

8 Claims, 6 Drawing Figures

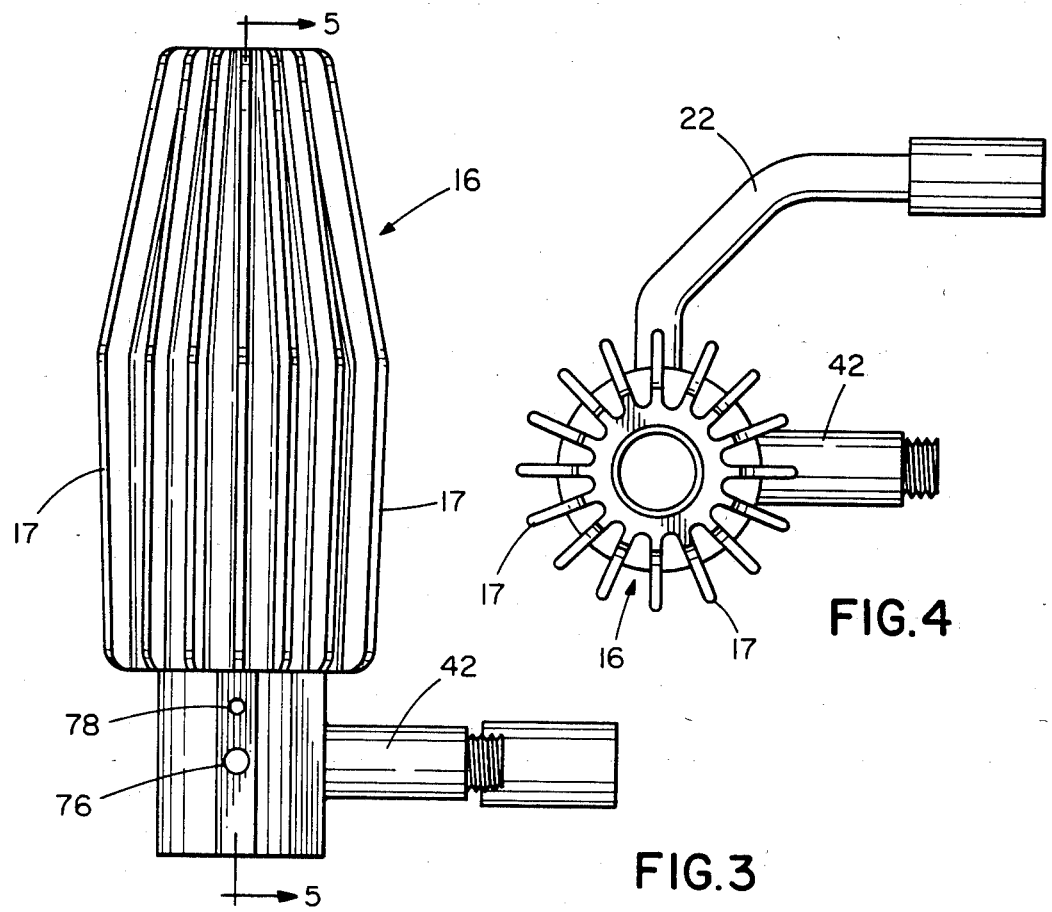
FIG.4
FIG.3
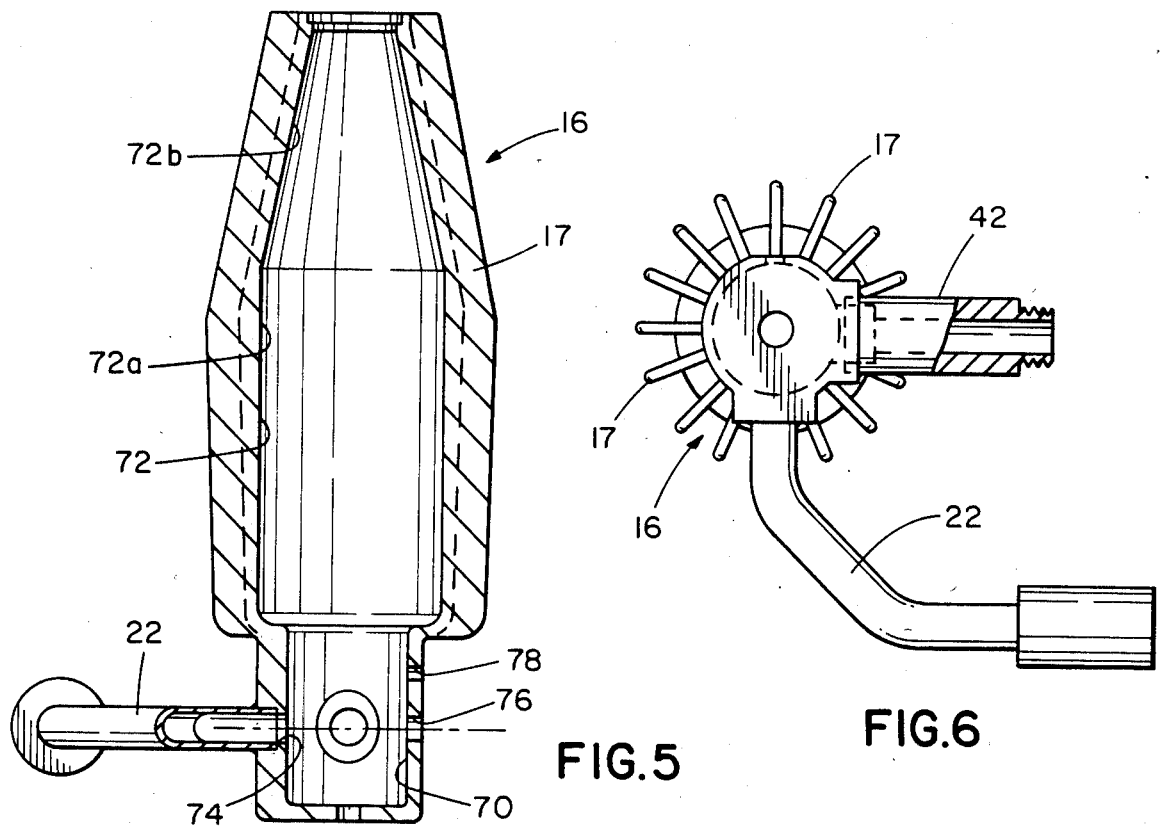
FIG.5
FIG.6

COMBUSTION CHAMBER CONSTRUCTION

BACKGROUND OF THE INVENTION

This invention pertains to an improved combustion chamber for a condensing furnace, and more particularly to a novel combustion chamber for a condensing furnace in which an air-fuel mixture is burned relatively silently and in an efficient manner.

Condensing heating apparatus or pulsating combustion heating apparatus has been described in the prior art. See, for example, Hallowell U.S. Pat. No. 4,164,210 and Kitchen U.S. Pat. Nos. 2,916,032, 3,267,985, 4,241,723, and 4,309,977. However, none of the described devices have been made and sold on a commercial basis for residential or commercial heating. The present invention stems from the Hallowell device as disclosed in U.S. Pat. No. 4,164,210, and is embodied in the first successful commercially available condensing gas furnace, which is made by Lennox Industries Inc. and presently identified as the G14 series. Basically in the disclosed Hallowell device, a combustible fuel gas and combustion air are admitted into a combustion chamber. To start the combustion cycle, a spark plug is used to ignite the fuel gas-air mixture to produce an internal explosion, with resultant generation of heat. Immediately after each such explosion, an accoustically-produced negative pressure in the combustion chamber draws additional air and fuel gas into the combustion chamber through appropriate air and gas valves, whereupon the next explosion occurs and closes the valves until the next negative pressure occurs. Once started, a series of heat releasing explosions are produced with combustion air and fuel gas being drawn into the combustion chamber intermittently through appropriate air and gas inlet valves. In response to the combustion chamber pulses of high pressure, the hot exhaust gases from the combustion chamber are normally expelled forcefully through an exhaust pipe to an exhaust expansion chamber from which an exhaust pipeline extends.

Room air to be heated may be passed by forced draft over the combustion system and then returned in heated condition to the room. Additional transfer of heat to the room air is obtained by providing a heat exchange coil with fins on the exhaust pipeline. Such heat exchange coil recovers and transfers to the room air the latent heat of vaporazation of the gas passing through the heat exchanger coil. A flue gas outlet is connected to the heat exchange coil for discharge of flue gas to the exterior. A drain line for condensing water is connected to the heat exchanger coil.

The prior art recognized that internal explosions within the combustion chamber caused loud noise. Various forms of combustion chambers and of muffler arrangements for such combustion chambers were proposed to attenuate the loud noise. Such loud noise would be particularly objectionable if the heating device or furnace was to be adapted for residential heating use. Consideration was also given in the prior art to encasing the combustion chamber and/or the condensing furnace cabinet in sound insulating material that would assist in the absorption of the sound and vibration caused by the pulsating combustion process. For example, Kitchen U.S. Pat. No. 4,309,977 suggests supporting the combustion chamber of a pulsating combustion apparatus in a concrete casing. Kitchen U.S. Pat. No. 3,267,985 suggests placing sound insulation in the space between the outer casing and the inner casing of the pulsating combustion furnace.

The combustion chamber of Hallowell U.S. Pat. No. 4,164,210 is a tube, which would be relatively noisy in operation. Kitchen U.S. Pat. No. 4,241,723 reveals a combustion chamber comprised of a pot-shaped bronze casting. The combustion chamber of Kitchen U.S. Pat. No. 4,309,977 is comprised of two iron castings secured together by bolts. The combustion chambers of Kitchen U.S. Pat. Nos. 4,241,723 and 4,309,977 are incapable of functioning as efficiently as that of the present invention. None of these prior art references teaches or suggests the novel combustion chamber of this invention which not only is relatively quiet, but also burns the air and fuel gas efficiently so as to increase performance in a practical and commercially feasible condensing furnace.

An object of the present invention is to provide a condensing furnace with an improved combustion chamber wherein disadvantages and deficiencies in prior constructions are obviated.

Another object of the present invention is to provide an improved combustion chamber for a condensing furnace made from a cast metal body having a fuel inlet and a port for receiving means for igniting the air-fuel mixture, said fuel inlet and said port being diametrically opposed to one another to enhance the ignition of the fuel and air.

Yet another object of the present invention is to provide an improved combustion chamber for a condensing furnace, such combustion chambers comprising an elongated cast body defining a mixing chamber and an expansion chamber, with the ratio of the transverse cross sectional area of the expansion chamber to the transverse cross sectional area of the mixing chamber being in the range of about 2/1 to 2.4/1 to maintain continuity of the pulse combustion operation.

A further object of the present invention is to provide a condensing furnace with an improved combustion chamber, wherein the ratio of the maximum Btu input for the condensing furnace with respect to the volume of the mixing chamber of the combustion chamber is in the range of 4,500/1 to 4,800/1.

Other objects and advantages of the present invention will be made more apparent hereinafter.

DESCRIPTION OF THE DRAWING

There is shown in the attached drawing a presently preferred embodiment of the present invention, wherein like numerals refer to like elements in the various views and wherein;

FIG. 3 is a front elevation view of the combustion chamber;

FIG. 4 is a top view of the combustion chamber;

FIG. 5 is a cross-sectional view of the combustion chamber taken generally along the line 5—5 of FIG. 3; and FIG. 6 is a bottom view of the combustion chamber, showing the connections of the fuel inlet and the gas inlet to the combustion chamber.

DETAILED DESCRIPTION OF THE PRESENT INVENTION

Figure 1:
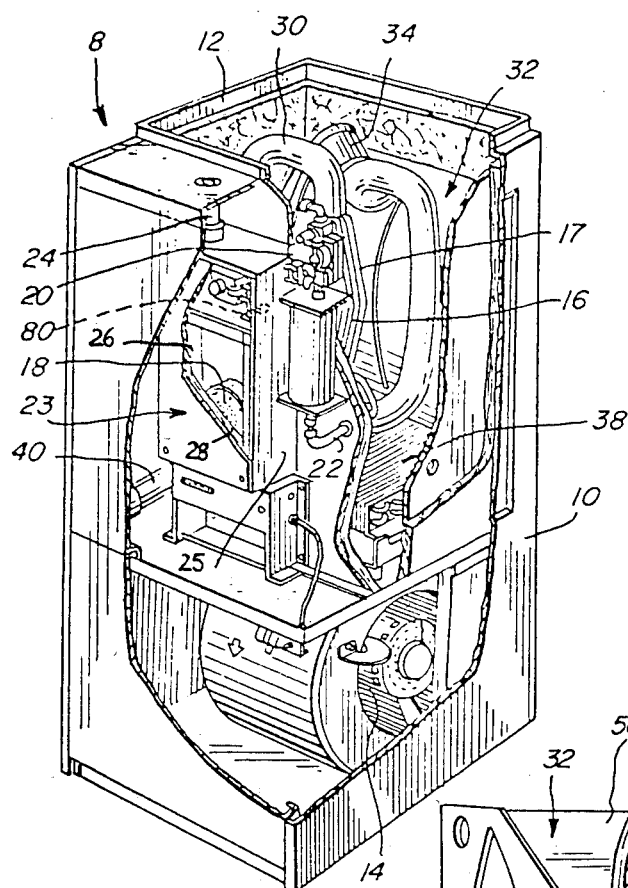
FIG. 1 is a perspective view of a condensing furnace with parts broken away to better show the interior components therein.

Referring now to the drawings, there is illustrated a condensing furnace or a pulsating type gas furnace 5 embodying the improved combustion chamber of the present invention. The gas furnace 8 comprises a housing 10 having room air outlet 12 at the upper end and a room air inlet at the lower end. Air is drawn through the housing 10 of the gas furnace 8 by centrifugal fan 14. While the furnace is illustrated as an upflow gas furnace, it will be apparent to those versed in the art that the combustion chamber of the present invention may be embodied in other forms of condensing furnace.

Supported within the housing 10 is the combustion chamber 16 of the present invention, which communicates with an air valve 18 for receiving combustion air and a gas valve 20 connected to a source of gas for providing the combustion fuel to the combustion chamber 16. The gas valve 20 communicates with the combustion chamber 16 via a conduit 22.

The air valve 18 is disposed in an air decoupler box 23. The air decoupler box 23 communicates with the air intake pipe 24 for providing a source of combustion air to the combustion chamber 16. Air decoupler box 23 is comprised of an outer imperforate sheet metal wall 25, inner perforated sheet metal wall 26, and insulating material 28 disposed between the inner and outer walls. The insulating material 28 is preferably fiberglass.

Extending from the combustion chamber 16 is an exhaust pipe or tail pipe 30 which forms a large loop within the housing 10 and communicates at its end remote from the combustion chamber 16 with an exhaust decoupler 32, which functions to dissipate some of the energy from the pulsating exhaust gases emanating from combustion chamber 16.

Resonator means 34 is secured to the side of the exhaust pipe 30 just prior to the connection of the exhaust pipe 30 to the exhaust decoupler 32. The resonator means 34 cancels a portion of the energy of the pulsating gases before it can drive the surface of the exhaust decoupler 32.

The exhaust gases will be discharged from the exhaust decoupler 32 through a conduit which communicates with the heat exchanger coil 38. Heat exchanger coil 38 comprises a plurality of thermally conductive conduits connected to fins for enhancing the thermal conducting capability of the heat exchanger coil 38 to transfer heat from the exhaust gases within coil 38 to the room air passing over the coil 38 as it flows through housing 10 from the inlet (not shown) to outlet 12. The spent exhaust gases from the heat exchanger coil 38 pass into the flue vent pipe 40 for discharge from gas furnace 8.

Figure 2:
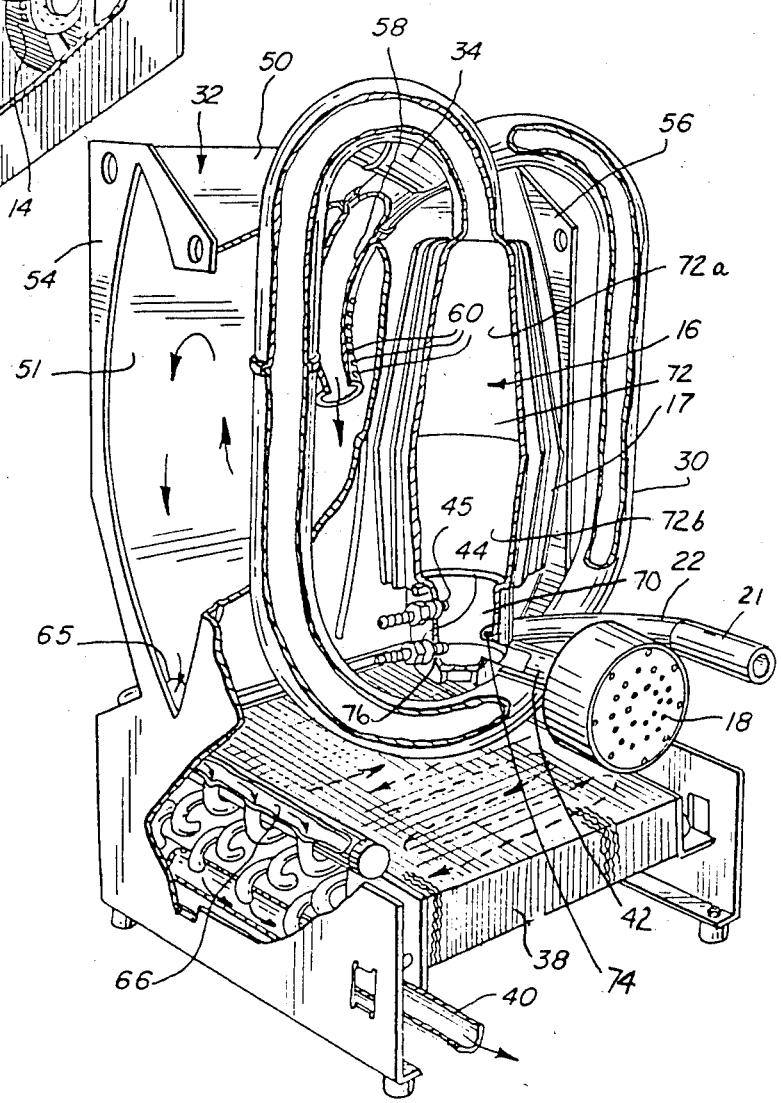
FIG. 2 is a perspective view of the combustion chamber and the sound reduction system of the condensing furnace.

Referring to FIG. 2, there is better shown the combustion chamber 16 of the present invention, which is specially designed and constructed so as to operate relatively quietly and in an efficient manner, as will be more fully explained hereafter. Air is supplied to the combustion chamber 16 through the air valve 18 which communicates with the mixing chamber 70 in the lower portion of the combustion chamber 16 by means of a conduit 42. Fuel is supplied to the combustion chamber 16 via the conduit 22, which is in communication with the gas valve 20. Orifice 21 is provided in conduit 22 to meter the gas supply to the combustion chamber 16. The air-fuel mixture is ignited initially by an automotive type spark plug 44 connected to the wall of the combustion chamber 16, and thereafter combustion occurs automatically at a pulsating combustion rate of about 58 to 68 cycles per second. A small quantity of gas is burned (approximately 0.0003 cubic feet for a 60,000 Btu input furnace) producing about ¼ to ½ Btu during each pulse, depending on the input rate. Above the spark plug 44 in the elongated body of the combustion chamber 16 is a flame sensor 45 which detects the flame in the combustion chamber 16 and terminates operation of the gas valve 20 if the flame goes out in the combustion chamber.

Almost complete combustion occurs with each pulse and the force of the controlled explosion creates great turbulence which improves heat transfer and forces the products of combustion through the combustion chamber 16, the tail pipe or exhaust pipe 30, the exhaust decoupler 32, the heating exchanger coil 38, and out the flue vent pipe 40.

The same force also creates a partial vacuum within the combustion chamber 16 which in turn draws in more gas through the conduit 22 and more air through the air inlet valve 18 that ignites from the retained combustion chamber heat. Gas furnace 8 uses substantially a conventional gas valve 20 that is operatively connected with a pair of free-floating reed valves, one for the gas and one for the air.

The exhaust decoupler 32 is fabricated from two sheets of heavy gauge sheet metal 50, 51 that are closed at the ends by planar sheets 54, 56. The sheets 50 and 52 are curved in an an opposed manner, one with respect to the other and define a vertically elongated chamber. Silencer tube 58 is connected to the inlet opening to the exhaust decoupler 32. The silencer tube 58 is in turn connected with the end of the tail pipe 30. Silencer tube 58, which is provided with a plurality of slots 60 along its length, is constructed and arranged to terminate the effective outlet from the tail pipe 30 in the approximate center of the exhaust decoupler 32 so as to dissipate pulsating energy.

The gases from exhaust decoupler 32 pass through outlet opening 65 into header 66 and then from header 66 into each of a plurality of tubes or conduits of heat exchanger coil 38. The gases from the heat exchanger conduits are collected in the flue vent pipe 40 for discharge from the condensing furnace 8.

The low temperature exhaust, on the order of 100° F. to 120° F., causes condensation of the water vapor in the flue gases in the heat exchanger coil 38, which returns to the system the latent heat of vaporization normally lost in conventional non-condensing furnaces. This water may be carried through the flue pipe 40 and discharged through a drip leg assembly to a floor drain in a path separate from the flue gas discharged through a flue vent that communicates with the exterior.

Turning now to FIGS. 3, 4, 5 and 6, there is a better illustrated the combustion chamber of the condensing furnace 8. The combustion chamber 16 basically comprises an elongated cast iron body having a mixing chamber 70 at the lower end and an expansion chamber 72 above the mixing chamber 70 within the elongated cast body. The expansion chamber 72 includes a generally cylindrical lower portion 72 and a generally frustoconical upper portion 72b. Opening 76 receives the spark plug 44 and opening 78 receives the flame sensor 45, which shuts off the gas valve 20 in the event of flame out in the combustion chamber 16. A fuel inlet or gas inlet port 74 is formed in the tubular body in communication with the gas conduit 22. As indicated in FIGS. 2 and 6, the gas inlet port 74 is disposed diametrically opposed to the opening or port 76 in the tubular body for the spark plug 44. It is a feature of the present invention that the fuel inlet 74 and the opening 76 for the spark plug be not only diametrically opposed but also in co-axial relationship so as to enhance the ignition of the fuel within the mixing chamber 70 in operation.

In addition to the disposition of the fuel inlet 74 relative to the opening 76 for the spark plug or igniting means 44 within the mixing chamber 70 of combustion chamber 16, there are other critical features which result in enhancement of overall operation of the condensing furnaces. One such critical feature is the ratio of the transverse cross sectional area of the expansion chamber 74 relative to the transverse cross sectional area of the mixing chamber 70. It has been ascertained that the continuity of operation is enhanced if the ratio of the maximum interior cross section of the expansion chamber 72 to the maximum interior cross sectional area of the mixing chamber 70 lie in the range of about 2/1 to 2.4/1. In one presently preferred form of the invention, the interior transverse cross sectional diameter of the expansion chamber 72 is 3-$\frac{3}{4}$" and the interior transverse cross sectional diameter of the mixing chamber 70 is 2-15/32". More specifically, it is preferred that the ratio of the cross sectional area of the lower portion 72A of the expansion chamber 72 to the cross sectional area of the mixing chamber 70 be in the range of 2.16/1 to 2.31/1.

To optimize performance of the pulsating combustion process, it is desired that the flame be confined to the mixing chamber 70. If the ratio of areas is less than about 2/1, then there is difficulty in maintaining continuity of operation and the condensing furnace cannot run as at high an input rate as desired. If the ratio of areas is greater than 2.4/1, flame continuity problems occur and it is difficult to maintain operation of the condensing furnace.

Another critical feature of the condensing furnace 8 of the present invention related to the combustion chamber 16 is that the ratio of the maximum British thermal unit (Btu) input for the condensing furnace 8 with respect to the volume of the mixing chamber 70 in the combustion chamber be maintained within the range of 4,500/1 to 4,800/1. In order to maintain the pulsating combustion process, it is necessary to maintain proper pressure within the system. The greater the volume in the expansion chamber 70 of the combustion chamber, the lesser the pressure in the system. Furthermore, it was noted that it was desired that the flame be retained within the mixing chamber 70 and that combustion not occur within the expansion chamber 72. The greater the volume of air relative to a fixed quantity of gas, the higher will be the flame point. The lesser volume of air relative to the fixed quantity of gas, the lower the flame point will be. Thus, it is desirable that the maximum input for the condensing furnace be 4,500 to 4,800 Btu per cubic inch of mixing chamber volume. Steady flame operation can be obtained by maintaining these parameters in design of a condensing furnace.

There has been provided by the present invention an improved combustion chamber for a condensing furnace which functions effectively to burn the fuel air mixture so as to help attain desired sound levels and maximum efficiency of operation. The condensing furnace of the present invention produces heat at an operating efficiency of higher than 90 percent. Though a gas furnace has been described, the combustion chamber of the present invention may be adapted for other fuels as, for example, oil.

While we have shown a presently preferred embodiment of the present invention, it will be understood by those skilled in the art that it may be otherwise embodied within the scope of the attached claims.

We claim:

1. In a condensing furnace including pulsating combustion chamber means and an exhaust pipe connected to the pulsating combustion chambers means, the improvement wherein the pulsating combustion chamber means relatively silently and efficiently burns an air-gas mixture and maintains continuity of operation with operating efficiencies in excess of 90 percent, said pulsating combustion chamber means comprising an elongated cast body having a mixing chamber for receiving gas and air, an expansion chamber communicating with said mixing chamber, a gas inlet in said body communicating with said mixing chamber, an air inlet in said body communicating with said mixing chamber, the air and the gas being mixed together in the mixing chamber, and means for igniting the air-gas mixture in said mixing chamber, said gas inlet and said igniting means being opposed to one another and being co-axial with one another to enhance the ignition of the gas and air in the mixing chamber, the transverse cross sectional areas of the mixing chamber and the expansion chamber being sized to maintain continuity of the pulsating combustion process and efficient burning of the gas, the ratio of the transverse cross-sectional area of the expansion chamber to the transverse cross-sectional area of the mixing chamber being in the range of 2/1 to 2.4/1.

2. A condensing furnace as in claim 1, including fins formed integrally on said elongated cast body for enhancing heat transfer from the combustion chamber.

3. A condensing furnace as in claim 1 wherein the igniting means comprises a spark plug.

4. A condensing furnace as in claim 1 wherein the ratio of the cross sectional area of the expansion chamber to the cross sectional area of the mixing chamber is in the range of 2.16/1 to 2.31/1.

5. In a condensing furnace including pulsating combustion chamber means and an exhaust pipe connected to the pulsating combustion chambers means, the improvement wherein the pulsating combustion chamber means relatively silently and efficiently burns an air-gas mixture and maintains continuity of operation with operating efficiencies in excess of 90 percent, said pulsating combustion chamber means comprising an elongated cast body having a mixing chamber for receiving gas and air, an expansion chamber communicating with said mixing chamber, a gas inlet in said body communicating with said mixing chamber, an air inlet in said body communicating with said mixing chamber, the air and the gas being mixed together in the mixing chamber, and spark plug means for igniting the air-gas mixture in said mixing chamber, said gas inlet and said igniting means being opposed to one another to enhance the ignition of the fuel and air in the mixing chamber, the opening for the spark plug into the mixing chamber and the opening for the gas inlet being co-axial with one another, said elongated cast body being oriented vertically in use, with the expansion chamber being above the mixing chamber, the transverse cross sectional areas of the mixing chamber and the expansion chamber being in the ratio in the range of 2/1 to 2.4/1 to maintain continuity of the pulsating combustion process and efficient burning of the fuel.

6. A condensing furnace as in claim 1, wherein the ratio of the maximum Btu input for the condensing furnace with respect to the volume of the mixing chamber expressed in cubic inches is in the range of 4,500/1 to 4,800/1.

7. A condensing furnace as in claim 1, including means for maintaining the gas-air mixture so as to confine the flame to the mixing chamber portion of the combustion chamber.

8. A condensing furnace as in claim 1, wherein the elongated cast body is oriented vertically in use, with the expansion chamber being above the mixing chamber.

* * * * *